US012303457B2

(12) United States Patent
Johnson

(10) Patent No.: US 12,303,457 B2
(45) Date of Patent: May 20, 2025

(54) SAUNA HEATING APPARATUS AND METHODS

(71) Applicant: High Tech Health International, Inc., Boulder, CO (US)

(72) Inventor: Erik Johnson, Boulder, CO (US)

(73) Assignee: HIGH TECH HEALTH INTERNATIONAL, INC., Boulder, CO (US)

( * ) Notice: Subject to any disclaimer, the term of this patent is extended or adjusted under 35 U.S.C. 154(b) by 1170 days.

(21) Appl. No.: 16/984,473

(22) Filed: Aug. 4, 2020

(65) Prior Publication Data

US 2020/0360230 A1 Nov. 19, 2020

Related U.S. Application Data

(63) Continuation of application No. 14/986,631, filed on Jan. 1, 2016, now Pat. No. 10,765,597, which is a continuation-in-part of application No. 14/467,003, filed on Aug. 23, 2014, now Pat. No. 9,770,386.

(51) Int. Cl.

| | |
|---|---|
| ***A61H 33/06*** | (2006.01) |
| ***H05B 3/00*** | (2006.01) |
| ***H05B 3/12*** | (2006.01) |
| ***H05B 3/26*** | (2006.01) |
| ***H05B 3/56*** | (2006.01) |

(52) U.S. Cl.

CPC ......... *A61H 33/063* (2013.01); *H05B 3/0085* (2013.01); *H05B 3/12* (2013.01); *H05B 3/26* (2013.01); *H05B 3/56* (2013.01); *A61H 33/066* (2013.01); *A61H 2201/0228* (2013.01); *A61H 2201/50* (2013.01); *H05B 2203/014* (2013.01); *H05B 2203/017* (2013.01)

(58) Field of Classification Search

None

See application file for complete search history.

(56) References Cited

U.S. PATENT DOCUMENTS

| | | | | |
|---|---|---|---|---|
| 3,361,895 A * | 1/1968 | Achner | A61H 33/06 607/81 |
| 4,008,367 A * | 2/1977 | Sunderhauf | H01B 7/0275 174/106 SC |
| 4,217,483 A | 8/1980 | Snyder et al. | |
| 4,626,665 A | 12/1986 | Fort, III | |
| 4,855,572 A * | 8/1989 | Wallgren | H05K 13/0486 219/466.1 |

(Continued)

FOREIGN PATENT DOCUMENTS

| | | |
|---|---|---|
| JP | 58104503 A | 6/1983 |
| KR | 10-1598171 B1 | 3/2015 |

*Primary Examiner* — Thor S Campbell

(74) *Attorney, Agent, or Firm* — Fountainhead Law Group, PC

(57) ABSTRACT

An apparatus for a sauna includes a first and second heating element. The first heating element has a first conductive path and is coupled to pass a current. The second heating element has a second conductive path that runs adjacent to the first conductive path. The second heating element substantially blocks an electric field produced within the first heating element. The first conductive path is coupled to redirect the current to the second conductive path and set up complementary magnetic fields between the first and second heating elements.

49 Claims, 14 Drawing Sheets

(56) References Cited

U.S. PATENT DOCUMENTS 4,882,466 A * 11/1989 Friel ...................... H01C 7/027 219/505
4,908,497 A 3/1990 Hjortsberg
4,998,006 A * 3/1991 Perlman .................. F24D 13/02 219/549
5,081,339 A 1/1992 Stine
5,157,240 A * 10/1992 Chow ................... C23C 14/243 219/466.1
5,206,485 A 4/1993 Srubas et al.
5,218,185 A * 6/1993 Gross ....................... H05B 6/34 219/528
5,304,767 A 4/1994 McGaffigan et al.
5,410,127 A * 4/1995 LaRue ................... H05B 3/342 219/528
5,465,013 A * 11/1995 Bassen ................. H01R 13/648 219/528
5,837,971 A * 11/1998 Lee ........................ H05B 3/342 219/528
5,908,573 A * 6/1999 Chiles ...................... H05B 3/34 219/545
6,153,856 A * 11/2000 Lee ........................ H05B 3/342 219/544
6,288,372 B1 * 9/2001 Sandberg ................. H05B 3/56 219/544
6,300,597 B1 * 10/2001 Lee ...................... H05B 1/0272 219/544
6,303,905 B1 * 10/2001 Chiles .................... H05B 3/347 219/544
6,415,104 B1 7/2002 Fitts et al.
6,528,770 B1 3/2003 Akel et al.
6,734,404 B2 * 5/2004 Hays ........................ H05B 3/56 219/528
6,958,463 B1 10/2005 Kochman et al.
7,120,353 B2 10/2006 Schaeffer et al.
7,151,241 B2 * 12/2006 Kil .......................... H05B 3/56 219/505
7,329,843 B2 * 2/2008 Bikhovsky ............. H05B 3/342 219/528
7,390,992 B2 * 6/2008 Morgandi .............. H05B 3/342 219/506
7,592,572 B2 9/2009 Schlipf
8,138,760 B2 * 3/2012 Bulatowicz ............ G01R 33/31 324/319
8,369,105 B2 * 2/2013 Shim ........................ G21K 1/00 381/189
8,426,779 B2 4/2013 Schlipf
8,676,044 B2 * 3/2014 O'Keeffe ............... H05B 3/008 392/416
8,692,168 B2 * 4/2014 Benda ................. F24D 19/1084 219/217
9,301,341 B2 * 3/2016 Riley ....................... H05B 3/06
9,770,386 B2 * 9/2017 Johnson ............. A61H 33/6005
9,788,367 B2 * 10/2017 Benda ...................... H05B 3/06
9,844,100 B2 12/2017 Duncan et al.
10,278,892 B2 5/2019 Benda et al.
2002/0195442 A1 * 12/2002 Lee ...................... H05B 1/0272 219/505
2003/0121140 A1 * 7/2003 Arx ..................... B29C 65/3412 219/544
2003/0156831 A1 * 8/2003 Schaeffer ................. A61N 5/06 392/416
2003/0183620 A1 * 10/2003 Wong ....................... H05B 3/34 219/549
2004/0112893 A1 6/2004 Okuda
2004/0173598 A1 * 9/2004 Ito ..................... H01L 21/67103 219/466.1
2007/0145041 A1 * 6/2007 Shim ...................... H05B 6/108 219/635
2008/0230536 A1 * 9/2008 Lee .......................... H05B 3/56 219/528
2009/0212040 A1 * 8/2009 O'Connor ................ H05B 3/56 219/548
2011/0081135 A1 * 4/2011 Felder .................. A21C 15/002 392/407
2013/0105458 A1 5/2013 Benda et al.
2015/0001206 A1 * 1/2015 Schlipf .................... H01C 3/14 219/544
2016/0051440 A1 * 2/2016 Johnson ............... A61H 33/063 4/524
2016/0227611 A1 * 8/2016 Hatton ..................... H05B 3/56
2017/0189266 A1 7/2017 Johnson
2018/0063898 A1 3/2018 Duncan et al.
2019/0110339 A1 * 4/2019 Duncan ................ A61H 33/063
2022/0151031 A1 * 5/2022 Kida ................. H01L 21/67103

* cited by examiner

SAUNA HEATING APPARATUS AND METHODS

CROSS REFERENCE TO RELATED APPLICATIONS

This application is a continuation application of U.S. patent application Ser. No. 14/986,631 titled "Sauna Heating Apparatus and Methods," filed Jan. 1, 2016, which is a continuation-in-part application of U.S. patent application Ser. No. 14/467,003 titled "Sauna Heating Apparatus and Methods," filed Aug. 23, 2014, all of which are incorporated herein by reference.

BACKGROUND

The present invention relates to heating apparatus, and in particular, sauna heating apparatus and methods.

A sauna is a small room used to provide a hot-air bath for sweating out toxins from the body. Electrical heaters have replaced older types of traditional methods of generating heat in many applications. Electrical heaters are relatively a new development in sauna design and innovations may be possible with sauna heating apparatus and methods.

SUMMARY

Embodiments of the present invention include an infrared apparatus to heat a body. The infrared apparatus comprises a first and second heating element. The first heating element has a first conductive path coupled to pass a current. The second heating element has a second conductive path running adjacent to the first conductive path. The second heating element terminates an electric field produced within the first heating element. The first conductive path is coupled to redirect the current to the second conductive path to set up complementary magnetic fields between the first and second heating elements.

Embodiments of the present invention include a method of manufacturing an apparatus to heat a body. The method comprises measuring, folding, attaching, placing, stretching, filling, vibrating, compressing, and heating. The folding includes folding a coiled wire. The coiled wire forms a fold between a first and a second conductive paths. The attaching includes attaching the coiled wire to an electrical insulator piece at the fold. The placing includes placing the coiled wire within a thermally and electrically conductive sheath.

The stretching includes stretching the coiled wire to the stretched length within the thermal conductive sheath. The filling includes filling the thermal conductive sheath with an electrical insulator material. The compressing includes compressing the thermal conductive sheath. The heating includes heating the thermal conductive sheath. The attaching electrical wires includes attaching electrical wires to a set of exposed leads corresponding to the first and second heating elements. The second heating element terminates an electric field produced within the first heating element, and the first conductive path redirects the current to the second conductive path to set up complementary magnetic fields between the first and second heating elements.

Embodiments of the present invention include an infrared apparatus to heat a body. The infrared apparatus comprises two or more pairs of heating elements having conductive paths with uniform current density. The heating elements are arranged in a circle and the circle is perpendicular to a center line which is parallel to a heating elements' length. Adjacent conductive paths are spaced a distance apart and have complementary currents, and the heating elements are spaced a radius from the center line intersecting the center of the circle.

Embodiments of the present invention include an infrared apparatus to heat a body. The infrared apparatus comprises one or more pairs of heating elements having conductive paths with uniform current density. The one or more pairs arranged in parallel along a single plane such that a first distance between pairs is less than or equal to a second distance from any of the heating elements to the body.

The following detailed description and accompanying drawings provide a better understanding of the nature and advantages of the present invention.

DETAILED DESCRIPTION

Described herein are techniques for sauna heating apparatus and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
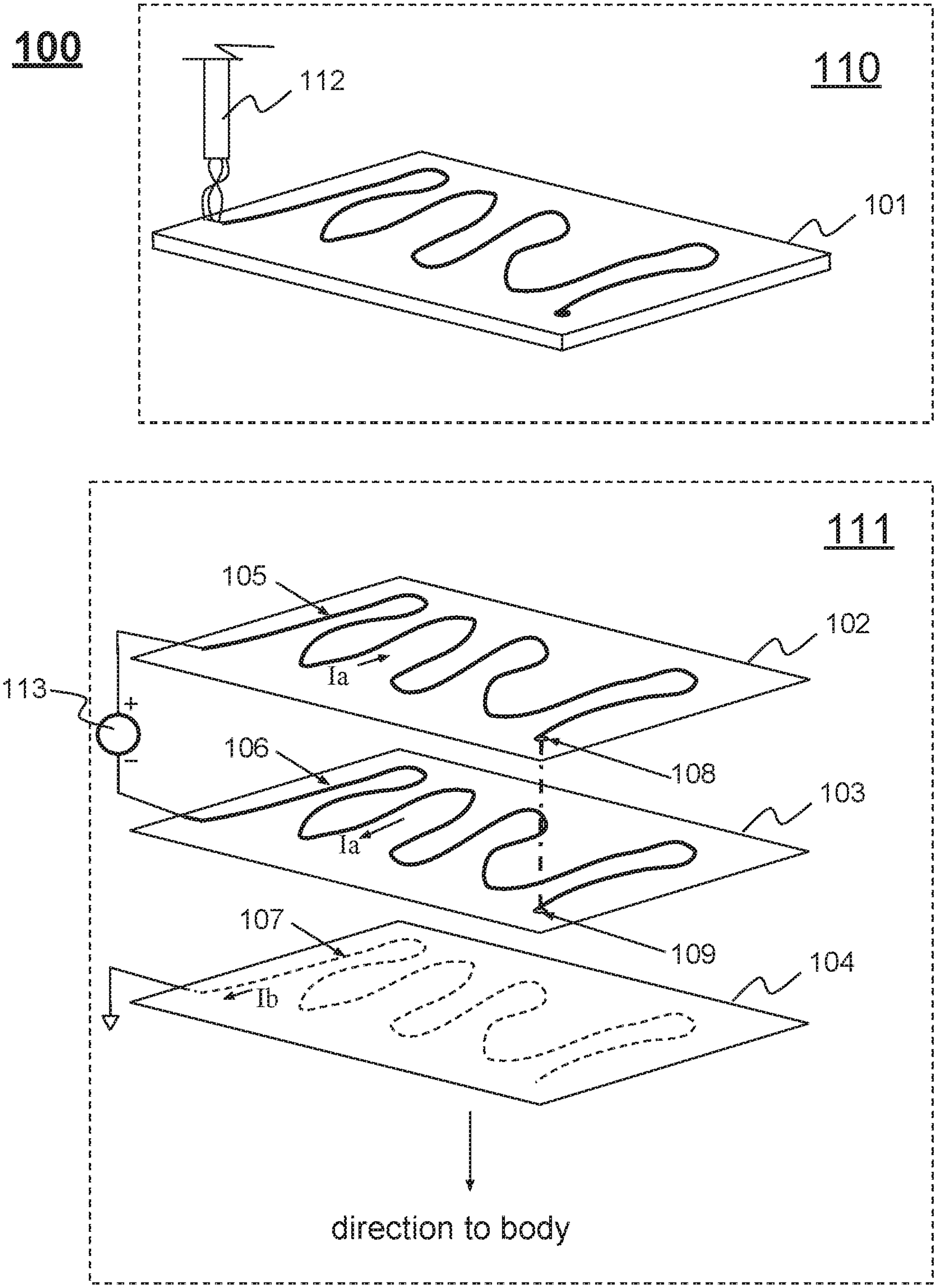
FIG. 1 illustrates views of an infrared apparatus to heat a body according to one embodiment of the invention.

FIG. 1 illustrates views 110-111 of an infrared apparatus 100 to heat a body according to one embodiment of the invention. View 110 illustrates printed circuit board (PCB) 101 having a twisted pair cable 112 to provide power to PCB 101. View 111 illustrates an exploded view of PCB 101. PCB 101 includes layers 102-104. Layer 102 has conductive path 105 which may be coupled to source 113 to pass current Ia. Conductive path 105 may take any route and be of any width or height which is able to be produced. The route of conductive path 105 may be designed to produce a more uniform heat. Alternatively, the route of conductive path 105 may be designed to focus the heat generated.

Layer 103 has conductive path 106 running coincident to conductive path 105. Conductive path 105 is coupled between point 108 and 109 to redirect the current Ia to conductive path 106 and set up complementary magnetic fields between layers 102-103. Layer 102 produces heat from current Ia.

Conductive path 105 may include a resistive element that produces the heat. Conductive path 106 may be metal which reduces the potential at layer 106. This may allow layer 106 to terminate the electrical field generated in layer 105.

Infrared apparatus 100 may also include layer 104 situated between the body and layer 103. Layer 104 may have conductive path 107 running coincident to conductive paths 105-106. In the case in which layers 102-103 produce heat, layer 104 may provide blocking of electric fields generated from layers 102-103, and conductive path 107 may provide current Ib which is less than one thousandths of current Ia. Layer 104 may radiate the heat. Layer 104 may be coupled to earth ground.

FIG. 2A-G illustrates printed circuit board stackups 211-217 according to other embodiments of the invention. Stackup 211-217 includes layers 201-209. Layers 201-204 may each have conductive paths and layers 205-209 may be electrically insulative planar substrates. Layers 202-203 may be similar to layers 102-103 of FIG. 1. Layers 205-209 may be FR4 material. Layers 205-209 may be made from mica.

Figure 2A:
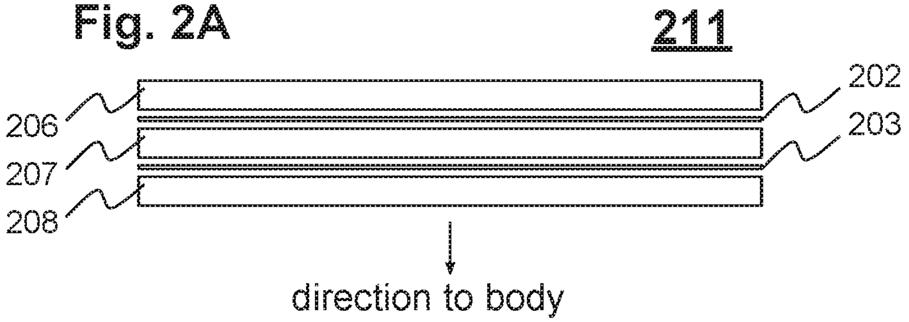
FIG. 2A-G illustrates printed circuit board stackups according to other embodiments of the invention.

FIG. 2A illustrates a PCB stackup 211. Stackup 211 includes layers 202-203 having conductive paths, and layers 206-208 which may be electrically insulative planar substrates. The conductive path of layer 202 may be coupled to the conductive path of layer 203 to pass a current in a similar manner as described in FIG. 1 above. Layer 203 may be made of metal and layer 202 may have resistive elements to produce heat. Alternately, layers 202-203 may both include resistive elements to produce heat. The heat produced may be transferred to layers 206-208. Layers 208 may be made of a material which may radiate the heat to the body as indicated. Layers 206-207 may be made of similar material (e.g. FR4) to simplify manufacturing, or layers 206-207 may be made of different material. For example, layer 206 may be made of a heat insulative material such that heat is not dissipated in a direction away from the body. Also, for example, layer 207 may be made of a heat conducting material to aid in the transfer of heat toward layer 208. Layer 207 may be made thinner than layer 208 to aid in that heat transfer to the body.

Figure 2B:
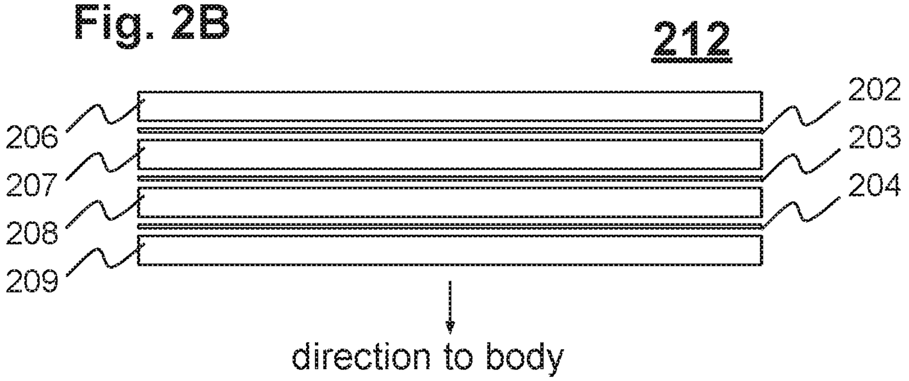

FIG. 2B illustrates a PCB stackup 212. Stackup 212 includes layers 202-204 having conductive paths and layers 206-209 which may be electrically insulative planar substrates. Layers 202-203 and 206-207 may function as described in FIG. 2A. Layer 208 may be made of a heat conductive material or made of similar material as layers 206-207. Layer 204 may be a conductive plane coupled to a low potential. Layer 204 may be brought closer to layers 202-203 by minimizing the width of layer 208. This may increase heat conduction through layer 208 and also decrease fringing of electrical fields produced by layers 202-203. Layer 209 may be made of a material that radiates heat which has been transferred from layer 202 or from both layer 202 and layer 203.

Figure 2C:
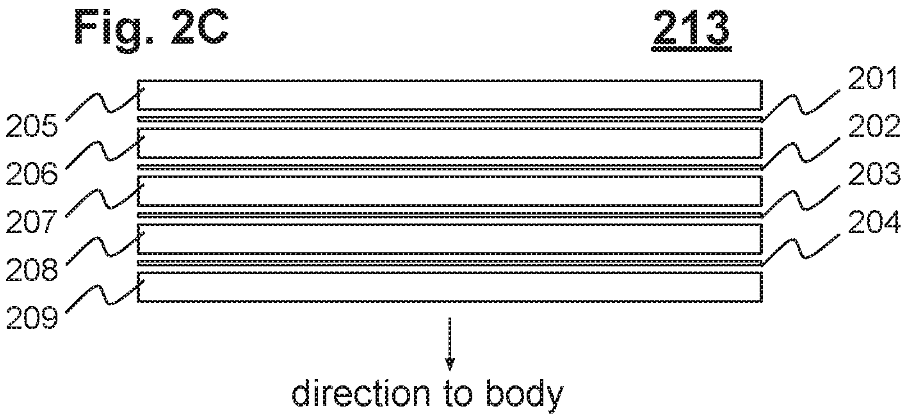

FIG. 2C illustrates a PCB stackup 213. Stackup 213 includes layers 201-204 having conductive paths and layers 205-209 which may be electrically insulative planar substrates. Layers 202-204 and 207-209 may function as described in FIG. 2A-B. Layer 201 may be a conductive plane coupled to a low potential such as ground, for example. Layer 205 may insulate heat. In an alternate embodiment, layer 205 may radiate heat and there may be a second body in the opposite direction of the body indicating, thereby allowing the heating apparatus to heat two separate chambers or direct heat in two opposing directions.

Figure 2D:
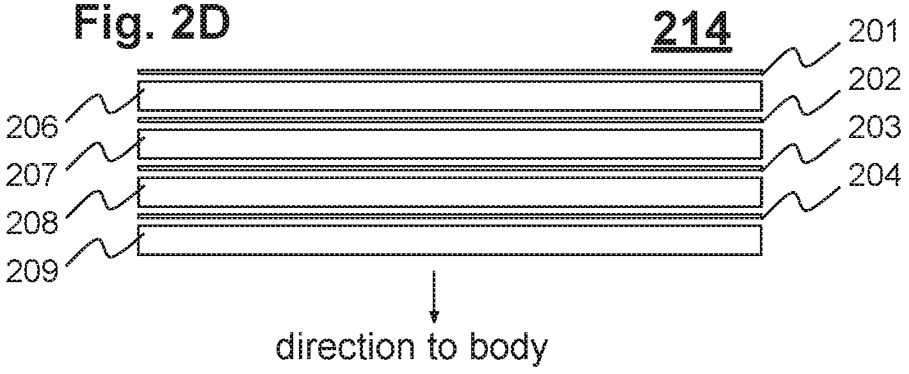

FIG. 2D illustrates a PCB stackup 214. Stackup 214 includes layers 201-204 having conductive paths and layers 206-209 which may be electrically insulative planar substrates. Layers 202-204 and 206-209 may function as described in FIG. 2A-C. Layer 201 may be a conductive plane as described above. Alternately, layer 201 may be a mesh. Layer 201 may be metal having a grating of less than or equal to ⅛ inch. Any greater size of grating will have a reduction in ability to block the electric fields generated from layers 202-203.

Figure 2E:
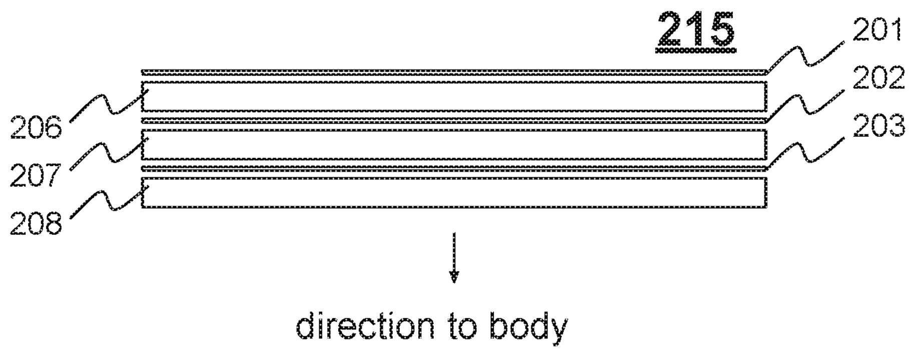

FIG. 2E illustrates a PCB stackup 215. Stackup 215 includes layers 201-203 having conductive paths and layers 206-208 which may be electrically insulative planar substrates. Layers 201-203 and 206-208 may function as described in FIG. 2A-D. Layer 208 may radiate heat to the body. Stackup 215 may be used as a minimal stackup that prevents electric fields from being propagated outside a sauna. In this embodiment, layer 203 may be made of metal in order to reduce the potential at layer 203 and provide some blocking of electrical fields being propagated toward the body.

Figure 2F:
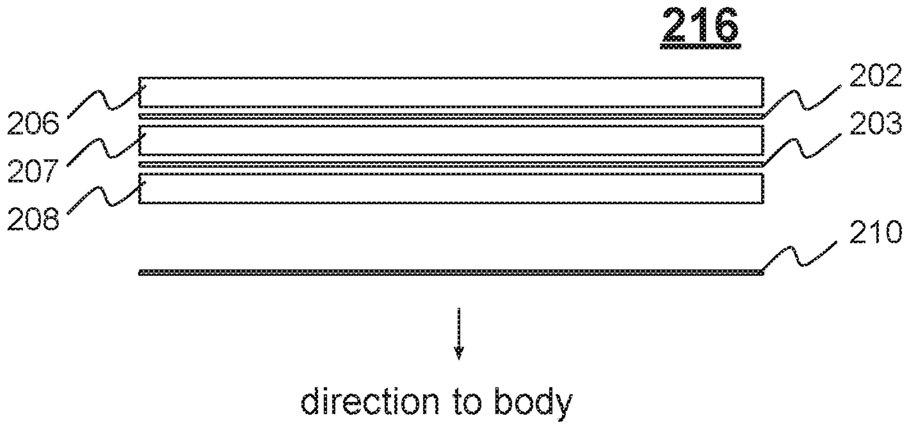

FIG. 2F illustrates a PCB stackup 216. Stackup 216 includes layers 202-203 having conductive paths and layers 206-208 which may be electrically insulative planar substrates. Layers 202-203 and 206-208 may function as described in FIG. 2A. Layer 210 may not be part of stackup 216. Layer 210 may be a conductive fabric attached to a cover in an enclosure residing the PCB. Layer 210 may be coupled to earth ground through the panel frame holding the conductive fabric. Alternately the conductive fabric may be part of a seat back cushion within the sauna.

Figure 2G:
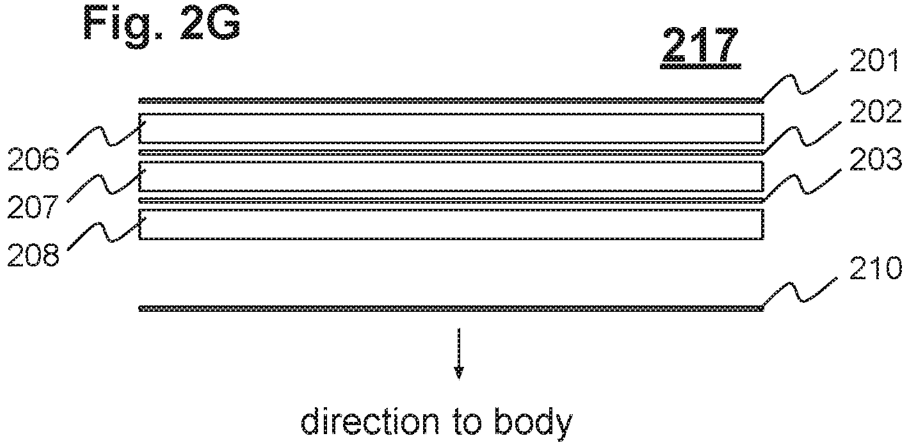

FIG. 2G illustrates a PCB stackup 217. Stackup 217 includes layers 201-203 having conductive paths and layers 206-208 which may be electrically insulative planar substrates. Layers 201-203 and 206-208 may function as described in FIG. 2A-F. Layer 210 and 201 may act as blocks to electrical fields. Layer 206 may be heat insulative such that layer 201 may not get above 30 degrees Centigrade.

FIG. 3A-D illustrates a layer 300 and corresponding detail views according to other embodiments of the invention. Layer 300 includes metal traces 301, resistive elements 302, connection 303, and via array 304. This shows the top view of layer 300 where the direction of the body is into the page. Layer 300 may be similar to layers 202-203 of FIG. 2A-G, for example.

Connection 303 provides an electrical current to metal traces 301 and resistive elements 302. The current flows from connection 303 to via array 304. The current drops down to layer 306. Layer 306 may be almost identical to the first such that the current is redirected such that the magnetic fields generated on layer 300 are cancelled by the magnetic fields generated on layer 306. The conductive paths of layer 300 and this second layer are said to be coincident because they lie one on top of the other in the stackup of layers.

Figure 3A:
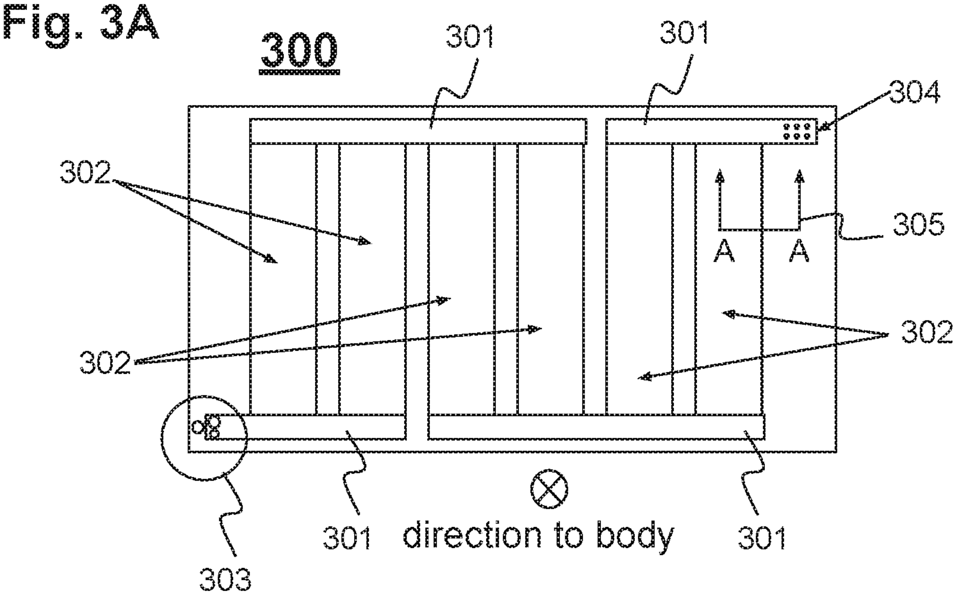
FIG. 3A-D illustrates a layer and corresponding detail views according to other embodiments of the invention.
Figure 3B:
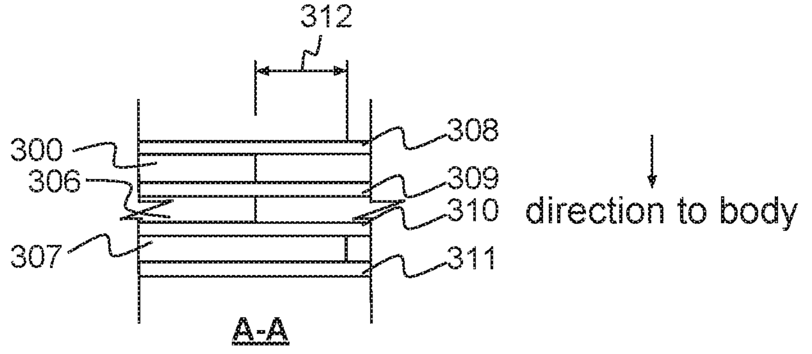

FIG. 3B includes a detail A-A of one embodiment of the invention. Layers 300, 306-307 have conductive paths. Layers 300 and 306 have resistive elements which produce heat, and layer 307 blocks electrical fields. Layers 308-311 may be electrically insulative planar substrates. Metal of layer 307 may superscribe the boundary of layer 300 and layer 306 by more than five times a distance between layers 306 and 307. Distance 312 shows the boundary of metal of layer 307 superscribing a boundary of resistive element 302 of layer 306 by more than five times the distance between layers 306 and 307. The boundaries of resistive and/or conductive elements of layers 300 and 306 may be incidental as shown.

Figure 3C:
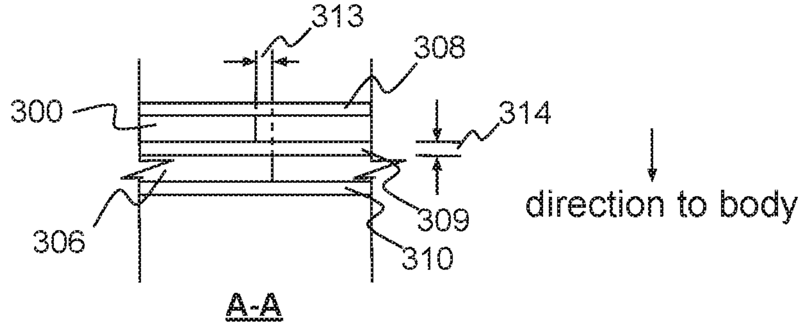

FIG. 3C includes a detail A-A of another embodiment of the invention. Layers 300 and 306 have conductive paths. Layers 308-310 may be electrically insulative planar substrates. Layer 300 has resistive elements which produce heat, and layer 306 is of metal which reduces the potential at layer 306. Layer 306 may aid in reducing the electric field propagating in the direction of the body. The metal of layer 306 may superscribe the boundary of layer 300 by more than a distance 314 between layers 300 and 306. Distance 313 shows the boundary of the metal of layer 306 superscribing a boundary of resistive element 302 of layer 300 by more than a distance 314.

Figure 3D:
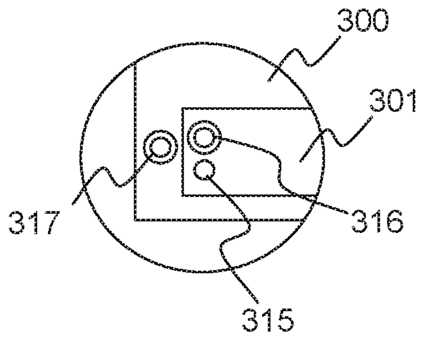

FIG. 3D includes detail 303 of yet another embodiment of the invention. Layer 300 has an end portion of trace 301. Connection point 315 lies at the end of the conduction path. Connection point 315 may be coupled to provide current. Connection point 316 lies on layer 306 through an opening in an end of the conductive path on layer 300. Connection point 316 may be coupled to provide a return path for the current. In one embodiment, connection point 317 lies on layer 307 through an opening in an end of the paths on layer 300 and 306. Connection point 317 may be connected to earth ground or some other low voltage point.

In a preferred embodiment connection points 315-316 are adjacent to each other and perpendicular to the conduction paths at the end of layers 300 and 306. Connection point 317 may be placed in close proximity to connection points 315-316. Connection points 315-317 may form an equilateral triangle allowing a shielded twisted pair cable to be coupled to the points with minimal radiation of both electric and magnetic fields.

Figure 4:
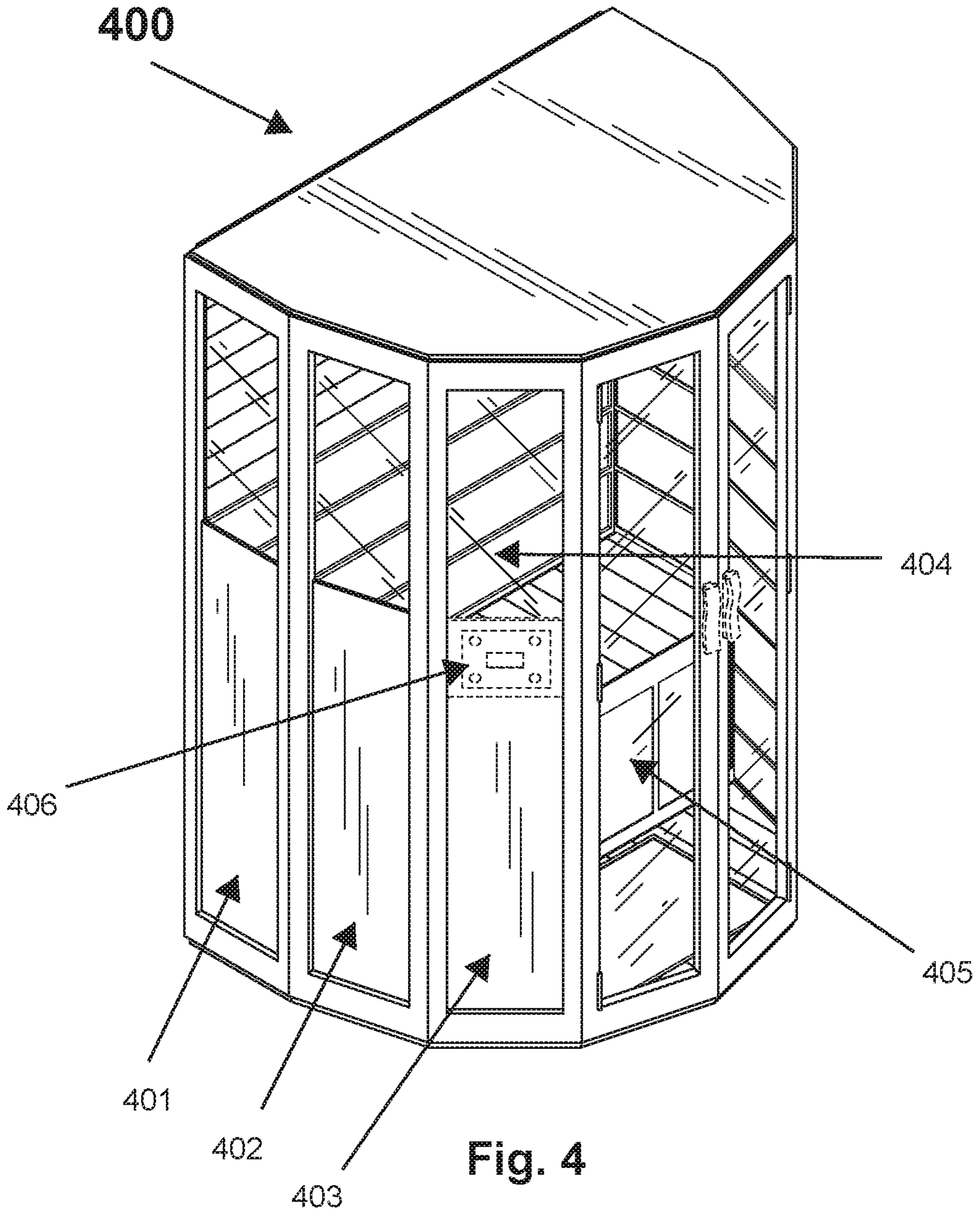
FIG. 4 illustrates a sauna according to yet another embodiment of the invention.

FIG. 4 illustrates a sauna 400 according to yet another embodiment of the invention. Sauna 400 includes a room and at least one infrared apparatus 400. The room has a plurality of walls (e.g. 401-403). The plurality of walls form an internal space in which a body may be heated. Infrared apparatus 404 may be located on the back wall of the sauna 400. In fact, many of the panels may be equipped with an infrared apparatus to heat the body of a person. Additional infrared apparatus 405 may be placed at the foot of the seating bench as well.

Additionally, every wall may be outfitted with an infrared apparatus. At least a portion of at least one infrared apparatus is coupled to at least one wall of the plurality of walls. The number of infrared apparatus may be determined by the desired final temperature and/or the speed at which the sauna is designed to reach its set temperature. Infrared apparatus 404-405 radiates heat toward the internal space of sauna 400.

In one embodiment, there may be a plurality of infrared apparatus to heat the body. The plurality may be controlled by controller 406. Controller 406 may pulse a number of infrared apparatus at a rate commensurate with the heating requirements. For example, infrared apparatus 405 may not be on as consistently as infrared apparatus 404 because the area at the foot of the enclosure may easily come to temperature. The plurality of infrared apparatus may allow for a much lower current to be used overall (i.e. higher resistive elements) so that the overall magnetic fields are minimized. These infrared apparatus panels may be made less expensive and a single supply (not shown) by used to multiplex between the infrared apparatus of sauna 400. Infrared apparatus 404 may have conductive fabric which may be coupled to earth ground such that electric fields are minimized. This conductive fabric may be part of a backrest cushion integrated as part of sauna 400

Figure 5:
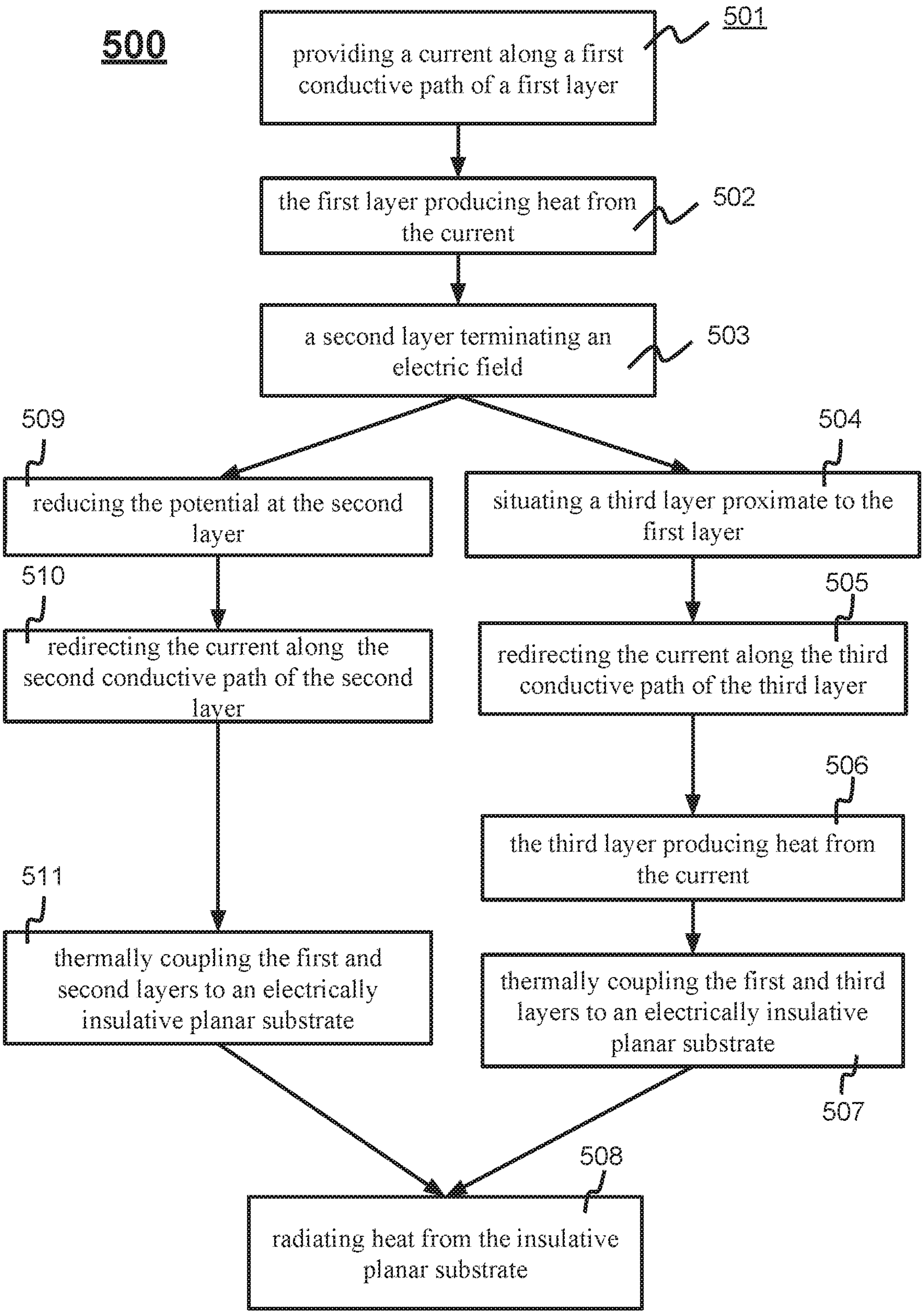
FIG. 5 illustrates a method of heating a body according to another embodiment of the invention.

FIG. 5 illustrates a method 500 of heating a body according to another embodiment of the invention.

At 501, provide a first current along a first conductive path of a first layer.

At 502, the first layer produces heat from the current. The first conductive path may include a resistive element that produces the heat from the current.

At 503, the second layer terminates an electric field produced within the first layer. The second layer has a second conductive path coincident with the first conductive layer.

At 504, situate a third layer proximate to the first layer. The third layer has a third conductive path running coincident to the first and second layers, and the third layer produces heat from the current. The second layer is situated between the body and the first and third layers.

At 505, the first conductive path is coupled to redirect the current to the third conductive path and set up complementary magnetic fields between the first and third layers.

At 506, the third layer produces heat from the current.

At 507, thermally couple the first and third layers to an electrically insulative planar substrate.

At 508, radiate heat from the insulative planar substrate.

Alternatively to 504, at 509, reduce the potential at the second layer.

At 510, redirect the current along the second conductive path of the second layer.

At 511, thermally couple the first and second layers to an electrically insulative planar substrate.

At 508, radiate heat from the insulative planar substrate.

Figure 6:
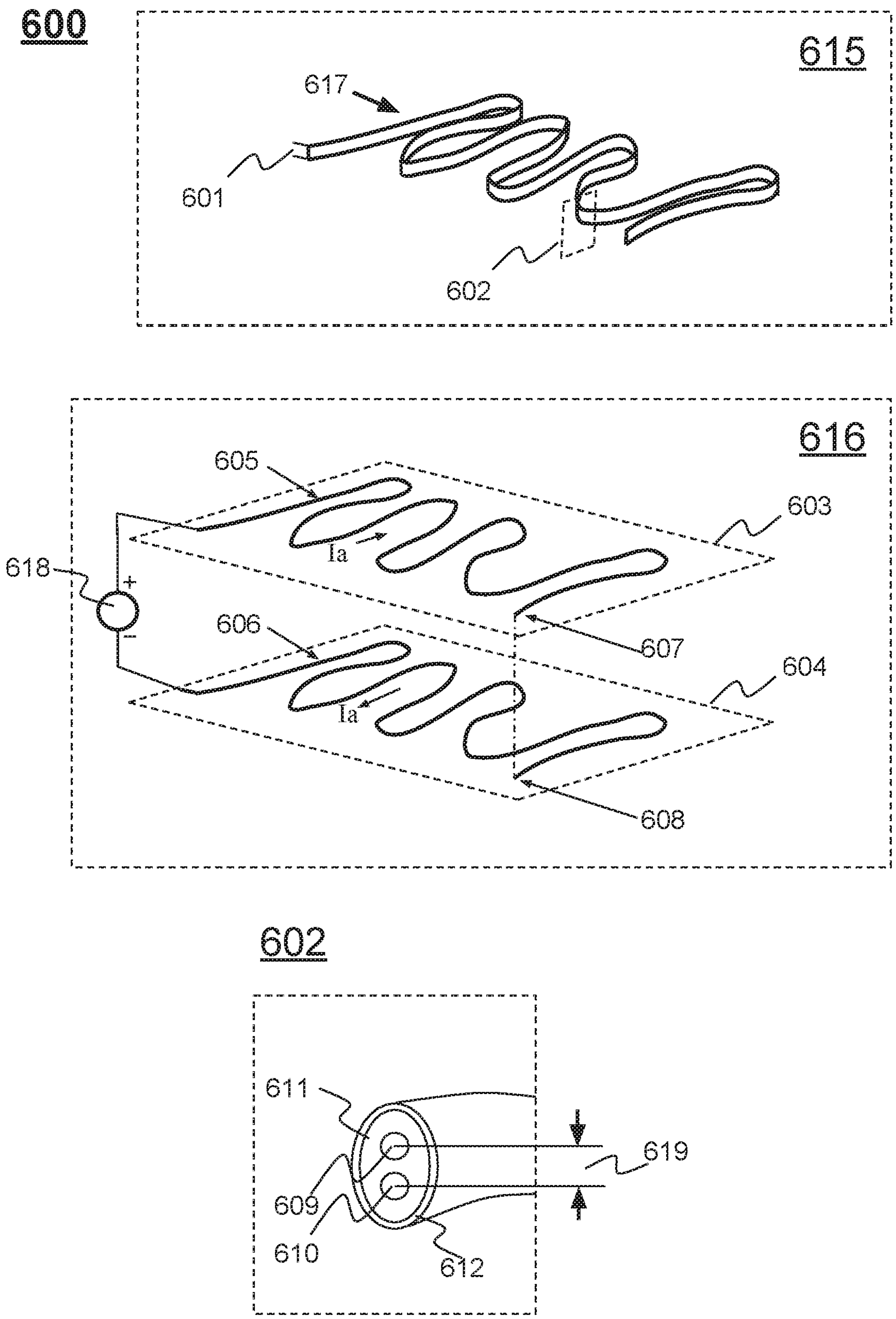
FIG. 6 illustrates views of an infrared apparatus to heat a body according to one embodiment of the invention.

FIG. 6 illustrates views 615-616 and 602 of an infrared apparatus 600 to heat a body according to one embodiment of the invention. View 615 illustrates rigid core wire form 617 having connectors 601 to provide power, and also illustrates cutaway 602 corresponding to view 602. View 616 illustrates an exploded view of rigid wire form 617. Rigid wire form 617 includes layers 603-604. Layer 603 has conductive paths 605-606 wrapped in a sheath 612 (see view 602). Center conductor 609 (see view 602) of conductive path 605 may be coupled to source 618 to pass current Ia. Layer 603 has conductive path 605 running coincident to conductive path 606. Conductive path 605 is coupled between point 607 and 608 to redirect the current Ia to conductive path 606 and set up complementary magnetic fields between layers 603-604. Rigid core wire form 617 produces heat from current Ia flowing in layer 603-604.

Detailed view 602 is taken from view 615. View 602 shows a cut-away view of the rigid wire form 617. Center conductor 609-610 may be nichrome wire. Electrical insulator 611 surrounds center conductors 609-610. Electrical insulator 611 may be made of magnesium oxide. Electrical insulator 611 may also be a good heat conductor. Sheath 612 may be metal such as copper, for example. Sheath 612 may radiate the heat. Sheath 612 may have a coating which radiates heat well.

Distance 619 between center conductors 609-610 will determine the level of coupling of the magnetic fields. The closer the conductors are placed the more coupling occurs and the more complementary the magnetic fields. Conductors 609-610 and electrical insulator 611 may be formed into an oblong shape (as shown) to facilitate bending about the shorter dimension while maintaining distance 619.

Figure 7A:
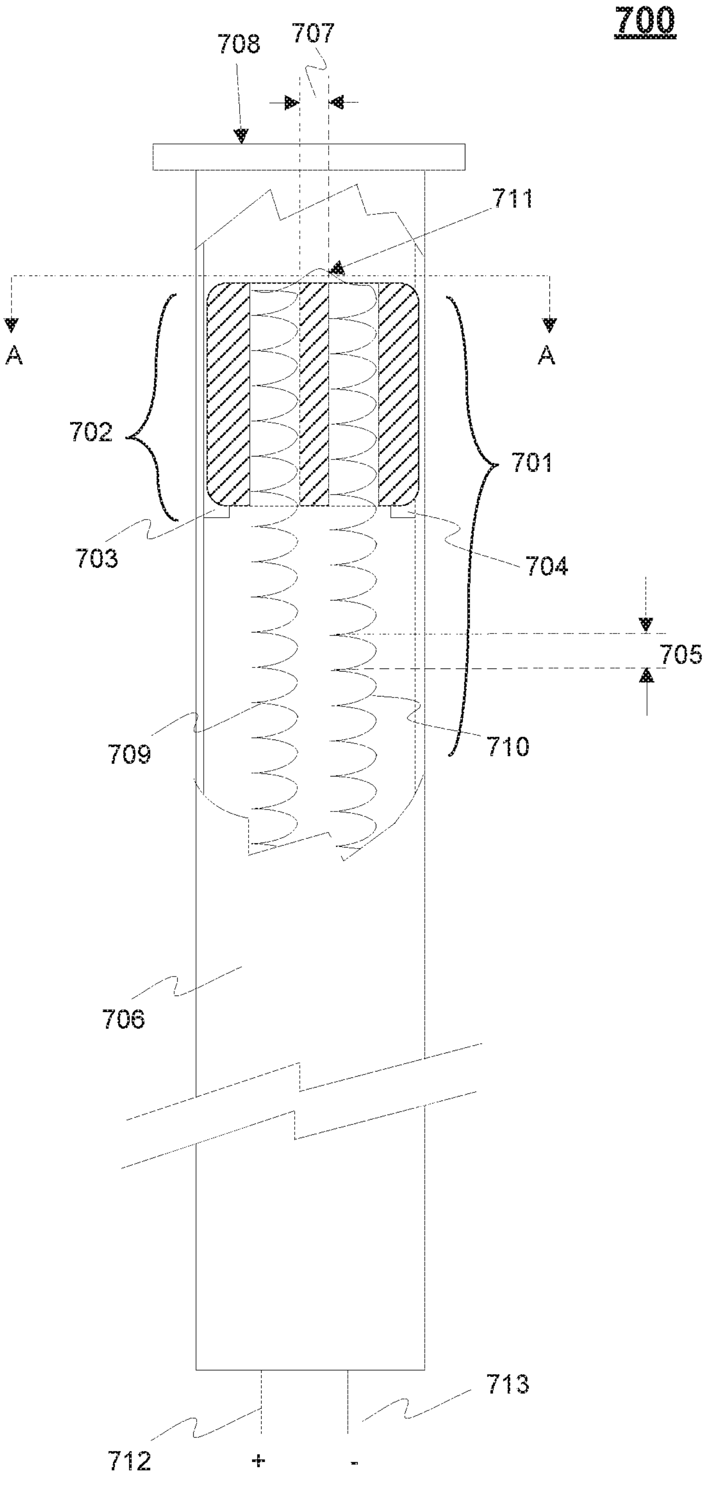
FIGS. 7A-B illustrate an infrared apparatus to heat a body according to one embodiment of the invention.
Figure 7B:
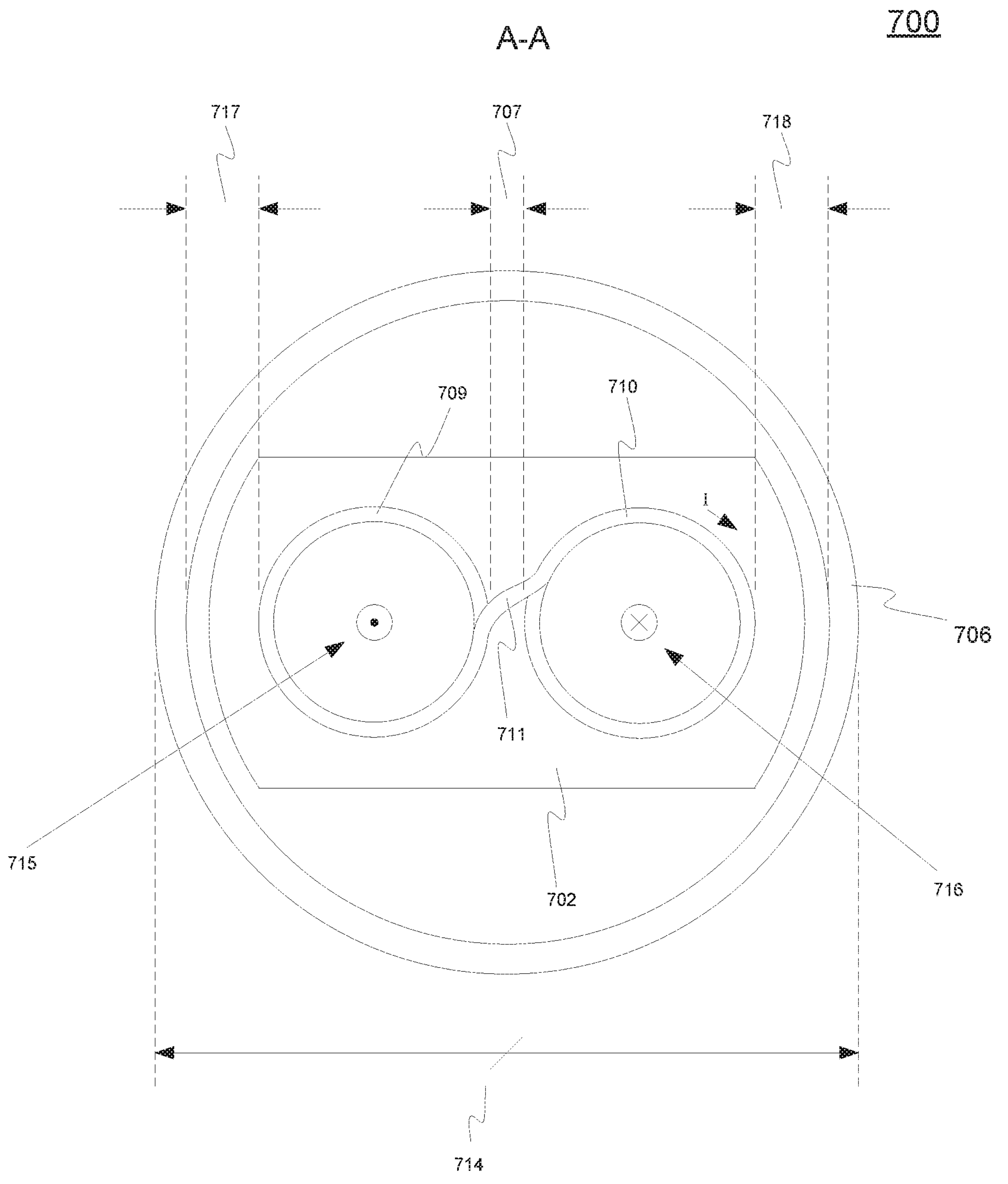

FIGS. 7A-B illustrate infrared apparatus 700 to heat a body according to one embodiment of the invention. Apparatus 700 includes heating elements 709 and 710 which are encapsulated within thermally and electrically conductive sheath 706. Sheath 706 may be filled with an electrical insulator material such magnesium, for example. Sheath 706 may include cap 708 at least one end of some form of steel tubing. The enclosed electrical insulator material may conduct heat and transfer the heat generated by heating elements 709-710 to sheath 706. Sheath 706 radiates the heat to the surrounding area. Cut-away view at 701 shows heating elements 709-710 and electrical insulator piece 702.

Heating element 709 is adjacent to heating element 710 and spaced distance 707 apart. Distance 707 is maintained by electrical insulator piece 702. Electrical insulator piece 702 fits within sheath 706 and remains situated in its positions with the aid of stops 703-704. Electrical insulator piece 702 may be made of a thermally insulator material like ceramic, for example. Electrical insulator piece 702 situates the conductive paths of heating elements 709-710 to run adjacent to one another. Heating elements 709-710 are coupled in series and formed about electrical insulator piece 702 to redirect the current and set up complementary magnetic fields between heating elements 709-710.

In this embodiment, heating elements 709-710 are made from a single nichrome wire coil which has been stretched and bent about point 711. The potential drop of voltage along the length of the wire allows for the heating element 710 to terminate an electric field produced within the heating element 709. Sheath 706 may be coupled to earth ground in order to terminate any remaining electric field generated from heating elements 709-710.

One end of the wire coil on heating element 709 side may be formed into lead 712. The other end of the wire coil on heating element 710 side may be formed into lead 713. In an alternate embodiment, leads 712-713 may be attached to the ends of wires to provide more rigid connection to the outside electrical circuit.

FIG. 7B illustrates top view A-A of infrared apparatus 700. Sheath 706 has an outside diameter 714. Electrical insulator piece 702 includes 2 holes which allow heating elements 709-710 to bend around point 711. Heating element 709 is distance 707 from heating element 710. Current I runs through the conductive paths of heating elements 709-710 to set up a magnetic field 715 coming out of heating element 709 and magnetic field 716 going into heating element 710. Magnetic fields 715-716 are complementary and have field lines (not shown) outside heating elements 709-710 which are also complementary. The coupling of these complementary magnetic fields may prevent them from radiating into the surrounding area thereby reducing the EMI (Electromagnetic Interference).

Electrical insulator piece may also situate heating element 709 a distance 717 from an inner portion of sheath 706 and situate heating element 710 a distance 718 from an opposite inner portion of sheath 706. Sheath 706 may be connected to earth ground and may prevent any additional electric field from radiating into the surrounding area.

Figure 8:
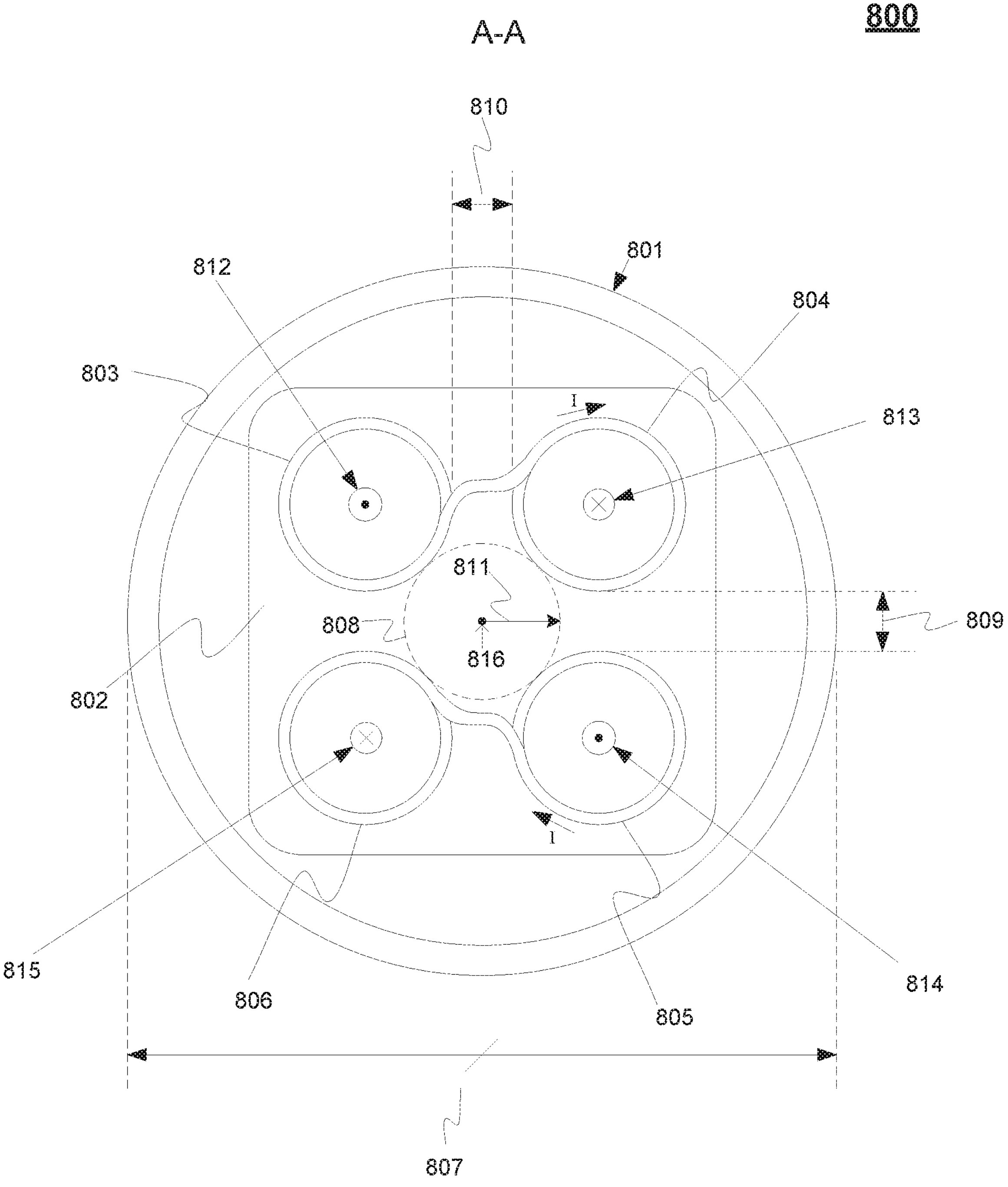
FIG. 8 illustrates an infrared apparatus to heat a body according to another embodiment of the invention.

FIG. 8 illustrates an infrared apparatus 800 to heat a body according to another embodiment of the invention. Infrared apparatus 800 includes sheath 801, electrical insulator piece 802, heater element pair 803-804, and heater element pair 805-806. Electrical insulator piece 802 includes 4 holes which support heating element pairs 803-804 to redirect current and support heating element pair 805-806 to redirect current as described for FIG. 7A-B.

Sheath 801 has an outside diameter 807 and encapsulates heating elements 803-806. Sheath 801 may be thermally and electrically conductive. Sheath 801 may be filled with an electrical insulator material. The enclosed electrical insulator material may conduct heat and transfer the heat generated by heating elements 803-806 to sheath 801. Sheath 801 radiates the heat to the surrounding area.

Heating element 803 is distance 810 from heating element 804 and heating element 805 is a distance 810 from heating element 806. Current I runs through the conductive paths of heating elements 803-804 to set up a magnetic field 812 coming out of heating element 803 and magnetic field 813 going into heating element 804. Current I runs through the conductive paths of heating elements 805-806 to set up a magnetic field 814 coming out of heating element 805 and magnetic field 815 going into heating element 806. Magnetic fields 812-813 are complementary and magnetic fields 814-815 are complementary.

Heating element pair 803-804 is a distance 809 from heating element pair 805-806. Heating element pair 803-804 and heating element pair 805-806 may be coupled in parallel to provide complementary magnetic fields. Magnetic fields 812-815 have field lines (not shown) outside heating elements 803-806 which are also complementary between adjacent heating elements and their corresponding conductive paths. The coupling of these complementary magnetic fields may prevent them from radiating into the surrounding area thereby reducing the EMI.

In general, an infrared apparatus (e.g. infrared apparatus 800) may comprise two or more pairs of heating elements (e.g. heating element pairs 803-804 and 805-806). Heating elements 803-806 have conductive paths with uniform current density.

Heating elements 803-806 are arranged in a circle 808. Circle 808 is perpendicular to a center line which is parallel to a heating elements' length. Adjacent conductive paths are spaced a distance (i.e. distance 810=distance 809) apart and have complementary currents. Heating elements 803-806 are spaced a radius 811 from said center line intersecting the center 816 of the circle 808.

In this way, an infrared apparatus may include two or more pairs of heating elements arranged in a circle. For example, 3 pairs of heating elements may be arranged in a circle as described above. The center points of the heating elements would look like the corners of a hexagon. Similarly, 4 pairs of heating elements may be arranged in a circle as described above, and the center points of these heating elements would look like the corners of an octagon.

Figure 9A:
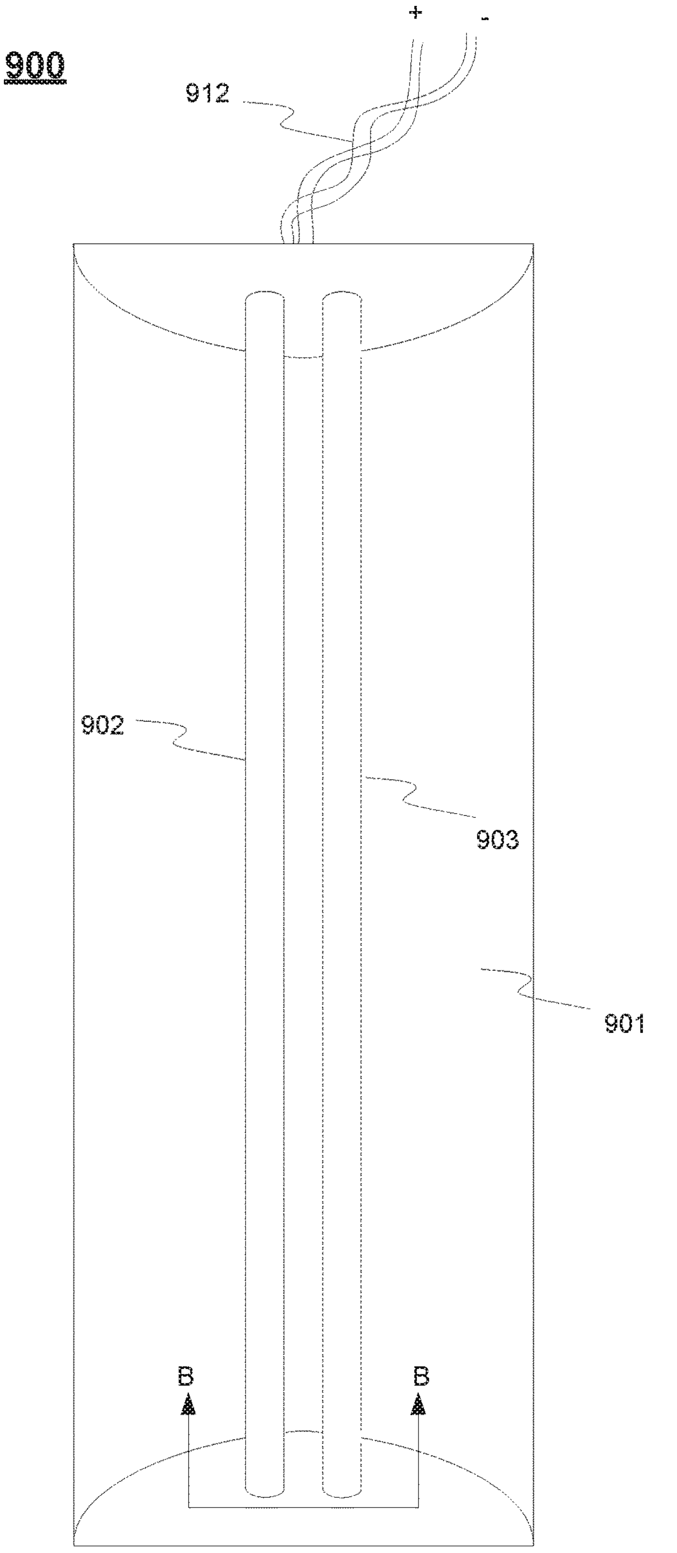
FIGS. 9A-B illustrate an infrared assembly to heat a body according to yet another embodiment of the invention.
Figure 9B:
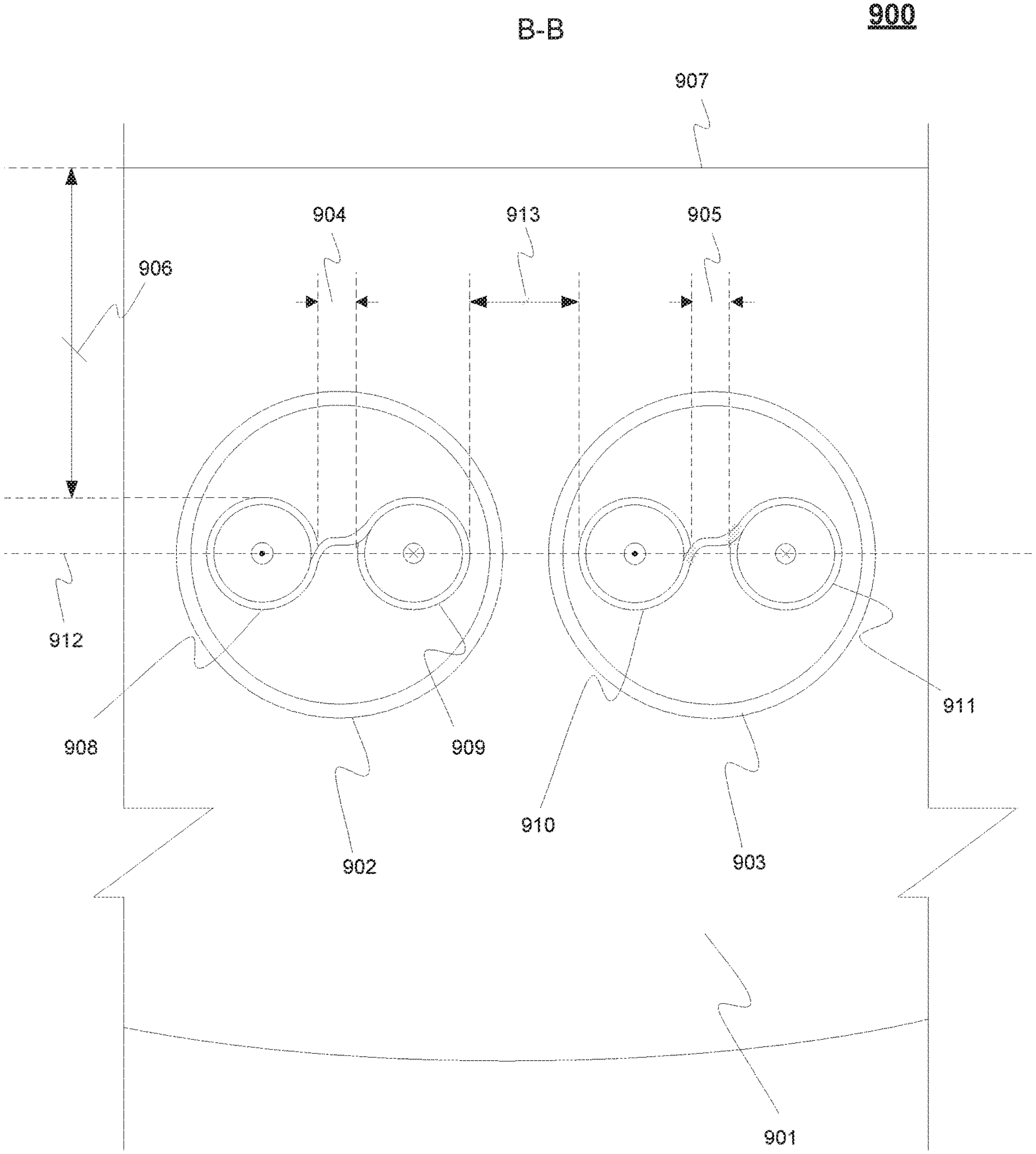

FIGS. 9A-B illustrate an infrared assembly 900 to heat a body according to yet another embodiment of the invention. FIG. 9A illustrates a front view of infrared assembly 900. Infrared assembly 900 includes heat reflector 901, infrared apparatus 902-903, and cabling 912. Cabling 912 includes a twisted pair which provides power to infrared apparatus 902-903. In one embodiment, cabling 912 couples infrared apparatus 902-903 in parallel.

FIG. 9B illustrates an indicated view B-B of infrared assembly 900 of FIG. 9A. View B-B shows infrared apparatus 902-903, and a portion of heat reflector 901. Infrared apparatus 902-903 may be similar to infrared apparatus 700 of FIG. 7A-B. Infrared apparatus 902 includes heater element 908-909 and infrared apparatus 903 includes heater elements 910-911. Heating elements 908-911 may have conductive paths with uniform current density.

Heater elements 908-909 may be set a distance 904 apart, and heater elements 910-911 may be set a distance 905 apart. In one embodiment, infrared apparatus 902 and 903 may be similar such that distance 904 is the same as distance 905.

Heater elements 908-911 may be arranged in parallel along a single plane 912. Distance 913 between heater element pair 908-909 and heater element pair 910-911 is less than or equal to distance 906. Distance 906 is the closest distance between any heating element and a body pressed up against plane 907. Plane 907 shows where a grated metal cover may be placed.

Figure 9C:
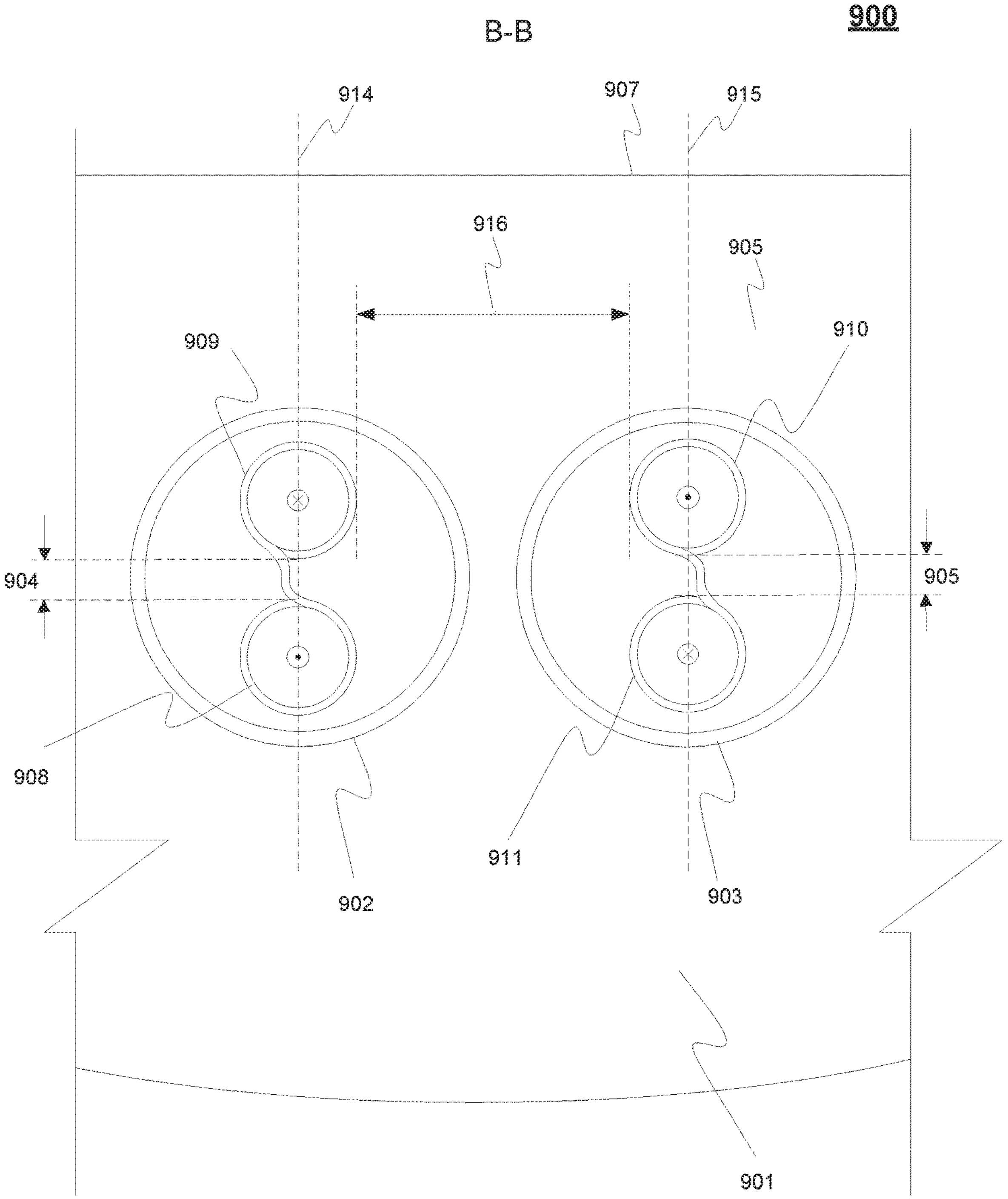
FIG. 9C illustrates another embodiment of the present invention in view B-B of the infrared assembly of FIG. 9A.

FIG. 9C illustrates another embodiment of the present invention in view B-B of infrared assembly 900 of FIG. 9A. View B-B shows infrared apparatus 902-903, and a portion of heat reflector 901 as in FIG. 9B. Infrared apparatus 902-903 are oriented 90 degrees from the orientation in FIG. 9B.

Heater elements 908-909 may be set a distance 904 apart, and heater elements 910-911 may be set a distance 905 apart. In another embodiment, infrared apparatus 902 and 903 may be similar such that distance 904 is the same as distance 905.

Heater elements 908-911 may be arranged in parallel along two planes 914-915. Distance 916 between heater element pair 908-909 and heater element pair 910-911 should be place as close as possible to increase coupling of the complementary magnetic fields. Distance 916 will be greater than distances 904-905 due to the electrical insulator piece (not shown), electrical insulator material (not shown) and the thermally and electrically conductive sheaths (not shown) around each pair of heating elements.

In one embodiment, infrared assembly 900 of FIG. 9B does not have infrared apparatus 903. Heating elements 908-909 are parallel to plane 907 at distance 906 away representing the closest a person could be to the heating element. To minimize the peak magnetic field at plane 907 ("the measurement plane"), heating elements 908-909 have opposite polarities and are placed distance 906 ("x") away from plane 907 and a distance 904 apart. This arrangement cancels out a significant fraction of the magnetic field. The amount of magnetic field cancelled may be optimized by minimizing distance 904. The minimum distance may be determined by factors regarding dielectric strength of the insulator occupying the space between heating elements 908-909 or mechanical restrictions, for example. This single pair of heating elements 908-909 in this configuration resulted in about 94% improvement of peak magnetic field radiation over a single heating element without magnetic coupling.

Further modeling and experiments were performed which confirmed that adding additional pairs of heating elements in a circular pattern, as described in FIG. 8, reduced the peak magnetic field measured at the measurement plane. The additional heat element pairs were modeled with the same distance between adjacent heating elements and the same distance "x" from the "measurement plane". For 2 pairs of heating elements (e.g. heating elements arranged as in FIG. 8) resulted in an additional 86.6% reduction of peak magnetic field radiation over the single pair configuration. For 3 pairs of heating elements (arranged in the circular pattern and resembling a hexagon) resulted in an additional 96.4% reduction in peak magnetic field radiation over the single pair configuration. For 4 pairs of heating elements (arranged in the circular pattern and resembling an octagon) resulted in an additional 98.6% reduction in peak magnetic field radiation over the single pair configuration.

Figure 10:
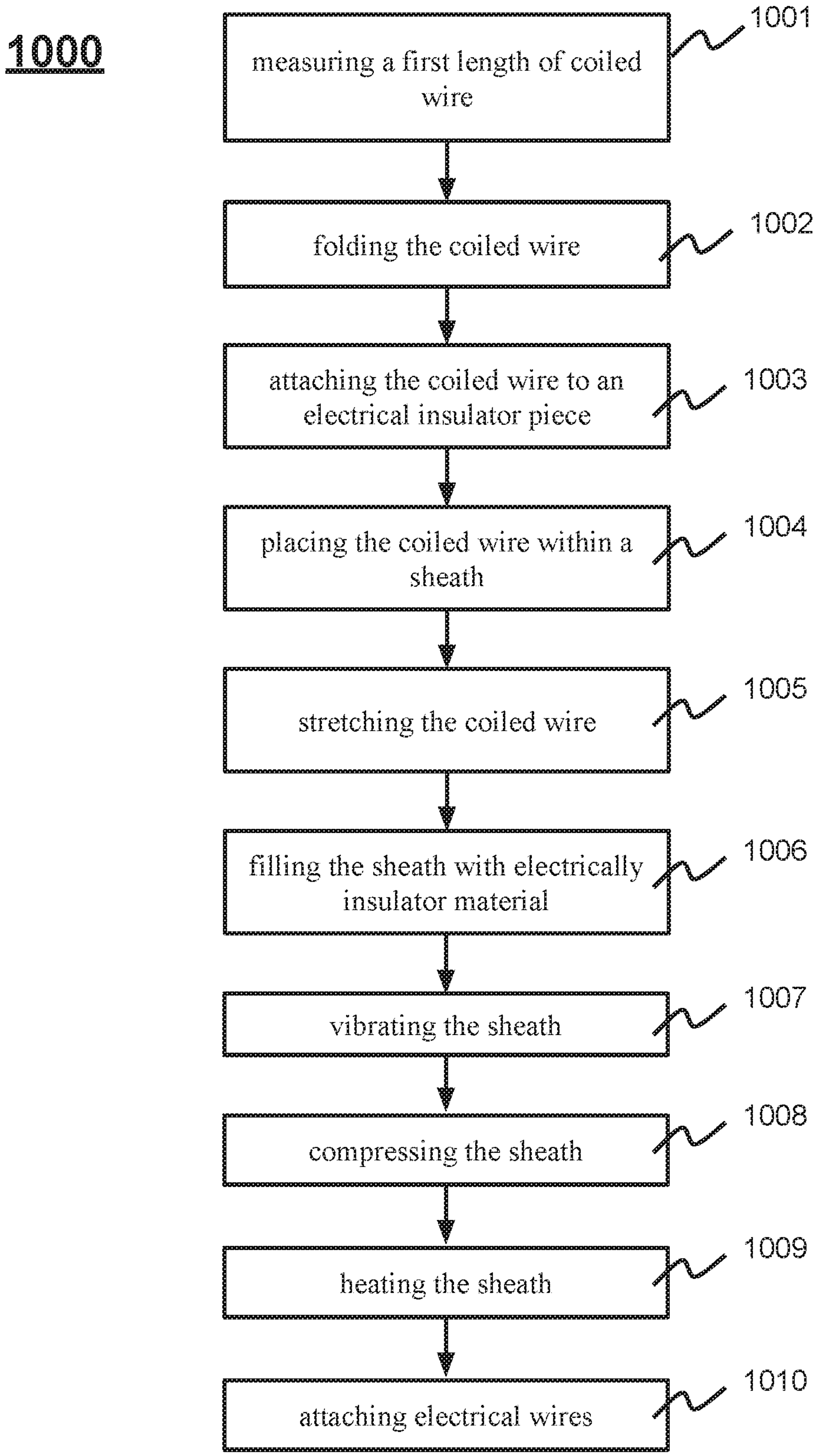
FIG. 10 illustrates a method of manufacturing an infrared apparatus according to one embodiment of the invention.

FIG. 10 illustrates a method 1000 of manufacturing an infrared apparatus according to one embodiment of the invention. Method 1000 includes measuring, folding, attaching, placing, stretching, filling, vibrating, compressing, and heating.

At 1001, the measuring includes measuring a first length of coiled wire corresponding to a stretched length of a first and second heating element. The wire may be nichrome.

At 1002, the folding includes folding the coiled wire. The coiled wire forms a fold between a first and a second conductive paths.

At 1003, the attaching includes attaching the coiled wire to an electrical insulator piece at the fold. The electrical insulator piece supports the first and second heating elements at a distance between them.

At 1004, the placing includes, placing the coiled wire within a thermally and electrically conductive sheath.

At 1005, the stretching includes stretching the coiled wire to the stretched length within the thermally and electrically conductive sheath. The stretching may result in the coiled wire having a uniform turns per unit length and a minimum spacing between adjacent coil turns. The minimum spacing may be based on a consistency of the electrical insulator material to maintain electrical insulation between the adjacent coil turns.

At 1006, the filling includes filling the thermally and electrically conductive sheath with an electrical insulator material. This electrical insulator material may be thermally conductive in its post processing state.

At 1007, the vibrating includes vibrating the thermally and electrically conductive sheath to distribute the electrical insulator material within the minimum spacing between adjacent coil turns.

At 1008, the compressing includes compressing the thermally and electrically conductive sheath.

At 1009, the heating includes heating the thermally and electrically conductive sheath.

At 1010, the attaching electrical wires includes attaching electrical wires to a set of exposed leads corresponding to the heating elements.

The above description illustrates various embodiments of the present invention along with examples of how aspects of the present invention may be implemented. The above examples and embodiments should not be deemed to be the only embodiments, and are presented to illustrate the flexibility and advantages of the present invention. Based on the above disclosure, other arrangements, embodiments, implementations and equivalents will be evident to those skilled in the art and may be employed without departing from the spirit and scope of the invention.

What is claimed is:

1. A sauna comprising:
a plurality of walls that define an internal space; and
a heating system comprising:
  a first conductor having a first conductive path;
  a second conductor having a second conductive path; and
  a third conductor situated around said first and second conductors,
  wherein at least one of said first conductive path and said second conductive path includes a resistive heating element that produces heat from a current,
  wherein said first conductive path is coupled to redirect said current to said second conductive path and set up complementary magnetic fields between said first conductor and said second conductor, and
  wherein said third conductor is coupled to a voltage to substantially block an electric field produced from the resistive heating element included in the at least one of said first conductor and said second conductor and radiates infrared heat directly to the internal space without passing through any intervening materials.

2. The sauna of claim 1 wherein the first conductive path includes a first resistive heating element that produces heat and the second conductive path includes a second resistive heating element that produces heat.

3. The sauna of claim 1 wherein the third conductor is a sheath surrounding the first conductor and the second conductor.

4. The sauna of claim 3 wherein the sheath includes therein an electrical insulator.

5. The sauna of claim 4 wherein the electrical insulator is thermally conductive to transfer heat to the sheath.

6. The sauna of claim 4 wherein the electrical insulator comprises magnesium oxide.

7. The sauna of claim 1 wherein the first conductor and the second conductor comprise wire coils.

8. The sauna of claim 7 wherein the resistive heating element comprises nichrome wire.

9. The sauna of claim 7 wherein the wire coils are stretched.

10. The sauna of claim 7 wherein the wire coils have substantially uniform turns per unit length and a spacing between adjacent coil turns.

11. The sauna of claim 7 wherein the wire coils are a single folded wire coil running adjacent to one another.

12. The sauna of claim 1 wherein the third conductor is thermally and electrically conductive.

13. The sauna of claim 1 wherein the third conductor is coupled to ground.

14. The sauna of claim 1 wherein the third conductor forms an oblong shape.

15. The sauna of claim 14 wherein the heating system comprises a bend about the shorter dimension of the oblong shape.

16. The sauna of claim 1 further comprising at least one electrical insulator within the sheath, the at least one electrical insulator comprising an even number of holes with the first and second conductors configured therein to arrange the first and second conductors a set distance apart and a set distance from the sheath.

17. The sauna of claim 1 further comprising a heat reflector.

18. The sauna of claim 17 wherein the first, second, and third conductors are arranged within a curved surface of the heat reflector.

19. The sauna of claim 17 wherein the first, second, and third conductors form a heater, wherein one or more of said heaters are arranged within a curved surface of the heat reflector.

20. The sauna of claim 19 wherein the first and second conductors of each heater are arranged in parallel along a single plane.

21. The sauna of claim 19 wherein the first and second conductors of each heater are arranged in parallel on at least two planes.

22. The sauna of claim 19 wherein one or more heaters and at least one reflector form said heating system, the sauna further comprising a plurality of said heating systems arranged in different locations and a controller, wherein the controller turns on different heating systems independently at different times.

23. The sauna of claim 1, the heating system further comprising:

a fourth conductor having a fourth conductive path; and a fifth conductor having a fifth conductive path;

wherein the third conductor is further situated around said fourth and fifth conductors wherein at least one of said fourth conductive path and said fifth conductive path includes a resistive heating element that produces heat from a second current, wherein said fourth conductive path is coupled to redirect said second current to said fifth conductive path and set up complementary magnetic fields between said fourth conductor and said fifth conductor, and wherein said third conductor substantially blocks an electric field produced from the resistive heating element included in the at least one of said fourth conductor and said fifth conductor.

24. The sauna of claim 1 wherein the third conductor comprises an external surface exposed to air to radiate infrared heat directly to the internal space.

25. The sauna of claim 1 wherein the third conductor comprises a metal tube.

26. A heating system comprising:

a first conductor having a first conductive path;

a second conductor having a second conductive path; and a third conductor situated around said first and second conductors, wherein at least one of said first conductive path and said second conductive path includes a resistive heating element that produces heat from a current, wherein said first conductive path is coupled to redirect said current to said second conductive path and set up complementary magnetic fields between said first conductor and said second conductor, and wherein said third conductor is coupled to a voltage to substantially block an electric field produced from the resistive heating element included in the at least one of said first conductor and said second conductor and radiates infrared heat directly to a surrounding space without passing through any intervening materials.

27. The heating system of claim 26 wherein the first conductive path includes a first resistive heating element that produces heat and the second conductive path includes a second resistive heating element that produces heat.

28. The heating system of claim 26 wherein the third conductor is a sheath surrounding the first conductor and the second conductor.

29. The heating system of claim 28 wherein the sheath includes therein an electrical insulator.

30. The heating system of claim 29 wherein the electrical insulator is thermally conductive to transfer heat to the sheath.

31. The heating system of claim 29 wherein the electrical insulator comprises magnesium oxide.

32. The heating system of claim 26 wherein the first conductor and the second conductor comprise wire coils.

33. The heating system of claim 32 wherein the resistive heating element comprises nichrome wire.

34. The heating system of claim 32 wherein the wire coils are stretched.

35. The heating system of claim 32 wherein the wire coils have substantially uniform turns per unit length and a spacing between adjacent coil turns.

36. The heating system of claim 32 wherein the wire coils are a single folded wire coil running adjacent to one another.

37. The heating system of claim 26 wherein the third conductor is thermally and electrically conductive.

38. The heating system of claim 26 wherein the third conductor is coupled to ground.

39. The heating system of claim 26 wherein the third conductor forms an oblong shape.

40. The heating system of claim 39, wherein the heating system comprises a bend about the shorter dimension of the oblong shape.

41. The heating system of claim 26 further comprising at least one electrical insulator within the sheath, the at least one electrical insulator comprising an even number of holes with the first and second conductors configured therein to arrange the first and second conductors a set distance apart and a set distance from the sheath.

42. The heating system of claim 26 further comprising a heat reflector.

43. The heating system of claim 42 wherein the first, second, and third conductors are arranged within a curved surface of the heat reflector.

44. The heating system of claim 42 wherein the first, second, and third conductors form a heater, wherein one or more of said heaters are arranged within a curved surface of the heat reflector.

45. The heating system of claim 44 wherein the first and second conductors of each heater are arranged in parallel along a single plane.

46. The heating system of claim 44 wherein the first and second conductors of each heater are arranged in parallel on at least two planes.

47. The heating system of claim 44 further comprising:

a fourth conductor having a fourth conductive path; and a fifth conductor having a fifth conductive path;

wherein the third conductor is further situated around said fourth and fifth conductors wherein at least one of said fourth conductive path and said fifth conductive path includes a resistive heating element that produces heat from a second current, wherein said fourth conductive path is coupled to redirect said second current to said fifth conductive path and set up complementary magnetic fields between said fourth conductor and said fifth conductor, and wherein said third conductor substantially blocks an electric field produced from the resistive heating element included in the at least one of said fourth conductor and said fifth conductor.

48. The heating system of claim 26 wherein the third conductor comprises an external surface exposed to air to radiate infrared heat directly to the internal space.

49. The heating system of claim 26 wherein the third conductor comprises a metal tube.

* * * * *